INVENTORS
JOSEPH A. FINGERETT
FRANK A. HILL
BY
ATTORNEY

INVENTORS
JOSEPH A. FINGERETT
FRANK A. HILL
BY
[signature]
ATTORNEY

INVENTORS
JOSEPH A. FINGERETT
FRANK A. HILL
BY
[signature]
ATTORNEY

March 18, 1958 J. A. FINGERETT ET AL 2,827,603

ELECTRIC MOTOR POSITIONING SYSTEM USING A MAGNETIC AMPLIFIER

Filed Feb. 26, 1954 5 Sheets-Sheet 4

INVENTORS
JOSEPH A. FINGERETT
FRANK A. HILL

BY

ATTORNEY

INVENTORS
JOSEPH A. FINGERETT
FRANK A. HILL
BY
ATTORNEY 2,827,603

ELECTRIC MOTOR POSITIONING SYSTEM USING A MAGNETIC AMPLIFIER

Joseph A. Fingerett, Pacoima, and Frank A. Hill, Van Nuys, Calif., assignors to Librascope, Incorporated, Glendale, Calif., a corporation of California Application February 26, 1954, Serial No. 412,796

34 Claims. (Cl. 318—30)

The present invention relates to magnetic amplifiers and more particularly to a novel method and apparatus for accelerating the response of such amplifiers and enabling the cascading of stages thereof without a response lag of a number of cycles proportionate to the number of stages cascaded.

In the field of magnetic amplifiers the basic characteristics of such devices may be best described with reference to the hysteresis loop. The parameters and shape of this loop characterize the magnetic material employed and the configuration of the core structure. It is usual to express the ordinate or vertical axis in terms of flux density (gausses) and the abscissa or horizontal axis in terms of magnetomotive force (oersteds).

With reference to the ordinate axis, the flux density measured in gausses is directly proportional to the number of volt-seconds per turn of winding per square centimeter of core cross-sectional area. Once the cross-sectional area of the core and the number of turns per winding have been fixed, then the ordinate value may be expressed in volt-seconds. Likewise, once the effective length of the magnetic path and the turns per winding for a given coil have been fixed, then the abscissa value may be represented in ampere units.

It will thus be perceived that "volt-seconds" is the time integral of the applied alternating voltage, which is, of course, the area under the voltage vs. time curve. It similarly becomes apparent that the rate of change of volt-seconds is voltage, which hereinafter may be referred to as "rate."

With reference to the hysteresis loop, positive saturation is reached where the upper portion of the curve levels off, and negative saturation occurs where the curve approaches the level in the lower portion. The core at saturation will exhibit no further increase in volt-seconds. The only effect of attempting to increase the volt-seconds beyond saturation is to increase the current. The same is true in respect to saturation in the opposite polarity or direction. In the upper half of the hysteresis loop, the level or point of maximum volt-seconds is termed "positive saturation," and in the lower half of the loop the level or point of maximum volt-seconds is termed "negative saturation."

The volt-seconds required to change the magnetic state of a core from positive saturation to negative saturation or vice versa will, of course, vary according to the cross-sectional area of the core and the magnetic material of which it is made, and may be conveniently referred to as the "volt-seconds capacity" of the core.

Core materials for magnetic amplifiers should be selected with the object of obtaining a relatively sharp differentiation between the impedance exhibited in the unsaturated and saturated states, respectively, and minimizing the current required to effect saturation. In general materials having rectangular hysteresis loops are satisfactory for these purposes; materials identified by the trademarks "Supermalloy," "MO-Permalloy," and "Deltamax" being examples thereof.

Earlier magnetic amplifiers have in general been subject to slow response; that is, a time lapse of several cycles of applied alternating voltage occurs between a signal input and its resulting output. In this manner a useful gain is achieved in magnetic amplifiers through memory or what might be termed the process of integration. However, bandwidth is adversely affected in favor of increased gain.

Later devolpments produced a magnetic amplifier generally known in the art as the so-called "fast response" or "reset" amplifier. The operation of this type of amplifier is best described with reference to two periods; consecutive half cycles of line voltage, of opposite polarity defining two periods characteristic of its operation. One period is the "resetting" or "signal input" period and the other period is known as the "power period." At the end of the power period, corresponding to the beginning of the next reset periods, both cores are saturated in the same direction, e. g., are positively saturated. During the succeeding reset period the cores in the absence of any signal are reset substantially equal amounts toward negative saturation by the resetting voltage. With reference to a hysteresis loop, such resetting is effected by introducing volt-seconds to the cores to change their magnetic states so that they are represented by points on the loop between positive and negative saturation. The introduction of a signal during this interval accelerates the resetting of one core and proportionally decelerates the resetting of the other core. During the succeeding power period, both cores advance toward the original or positive saturation state at the same rate. As a result of the differential resetting of the cores, one necessarily reaches positive saturation prior to the other, and in the interval of time between such positive saturation of one core and such positive saturation of the other, power is delivered to a load. Subsequent to saturation of the second core no power is delivered to the load, and the cycle is complete when the succeeding reset period begins.

If a greater power gain is required than can be achieved with a single stage amplifier of this reset type, resort must be had to cascaded stages. In such cascaded reset amplifiers the power period of the first stage corresponds to the reset period of the second stage, and similarly for additional stages. Therefore, each additional stage employed results in an additional half cycle delay between the input to the amplifier and the resultant output obtained therefrom.

The operation of magnetic amplifiers embodying the present invention may be described with reference to a single period; not more than a single half cycle of the applied line voltage defining the entire period characteristic of its operation. The input and resulting output therefrom occur successively within this same period. Two associated cores proceed from one saturated state to the other saturated state, (e. g., from positive saturation to negative saturation) within the same period. During the succeeding period these cores reverse and proceed to the original (positive) saturation state. The signal is introduced when both cores are proceeding from either saturated state toward the other saturated state and prior to the saturation of either core. This is known as the signal input interval. Both cores proceed toward saturation at substantially the same rate in the absence of a signal. However, the introduction of a signal during the input interval increases the rate at which one core proceeds toward saturation, and reduces the rate at which the other core proceeds toward the same state of saturation. As a result of the temporal separation of the core saturations, power is delivered to a load in the interval of time between the saturation of the cores. The introduction of the signal is the cause of such temporal separation and hence controls the resulting output.

As a general rule the signal voltage tends to establish load current. However, if this were permitted, the amplifier would provide practically no power gain. The present invention establishes a high impedance path between the signal input and the load to power transfer during the signal input interval without affecting the signal influence on the temporal separation of the times of core saturation. During the power output interval, the high impedance path becomes a low impedance path to power transfer thereby enabling power gain.

Since the entire cycle of operation of the amplifiers in accordance with the present invention is completed within one half cycle of the applied line voltage or, as a matter of fact, within a small portion of the half cycle starting at the beginning of the half cycle, it is possible to cascade several stages of amplification, the output of each stage occurring within the signal input interval of the following stage; all within the same half cycle. Consequently, a signal input to the first stage during the early part of the half cycle will produce a resultant output from the last stage within the given half cycle, this output being independent of signals introduced prior to the given half cycle.

The operation of magnetic amplifiers in accordance with the present invention may be considered as being reversible because a complete cycle of operation of the amplifier may be effected as the cores proceed either from positive to negative saturation or from negative to positive saturation. A cycle of amplifier operation is completed when the cores are moved from one to the opposite state of saturation during one half cycle of applied line voltage. Another cycle of amplifier operation may be completed immediately thereafter when the cores are moved from said opposite state back to the original state of saturation; this, of course, occurring during the succeeding half cycle of line voltage. Also, during the half cycle of line voltage causing the cores to proceed from one to the other state of saturation, the signal input takes effect prior to saturation of either core and the temporal separation of core saturations is effected in the manner hereinbefore explained, enabling a power output subsequent to saturation of the first core and prior to the saturation of the second core. Since a high impedance path is established between the signal input and the load to power transfer during the signal input interval, and since the high impedance path becomes a low impedance path for power transfer during the power output interval, then it may be seen that signals of either polarity or "alternating current" signals may be amplified.

With the foregoing in mind, among the objects of the present invention are the following: The provision of a magnetic amplifier capable of executing an entire cycle of amplifier operation within the interval of one half cycle of applied line voltage; the provision of a magnetic amplifier capable of operation during each and every half cycle of applied line voltage; the provision of a magnetic amplifier capable of outputs at higher voltage levels for a given line voltage than heretofore achieved; the provision of a magnetic amplifier capable of a plurality of stages of amplification with a total time delay of less than one half cycle of applied line voltage; the provision of a multi-stage magnetic amplifier wherein each stage receives its input during the output period of the preceding stage, all successively effected within one half cycle of applied line voltage; and the provision of such a multi-stage magnetic amplifier affording an increased gain per unit time delay.

Other and further objects of the invention will become apparent to those skilled in the art from a reading of the following detailed description when taken in the light of the accompanying drawings, wherein.

Figures 7A, 7B, 7C, 7D, 7E:
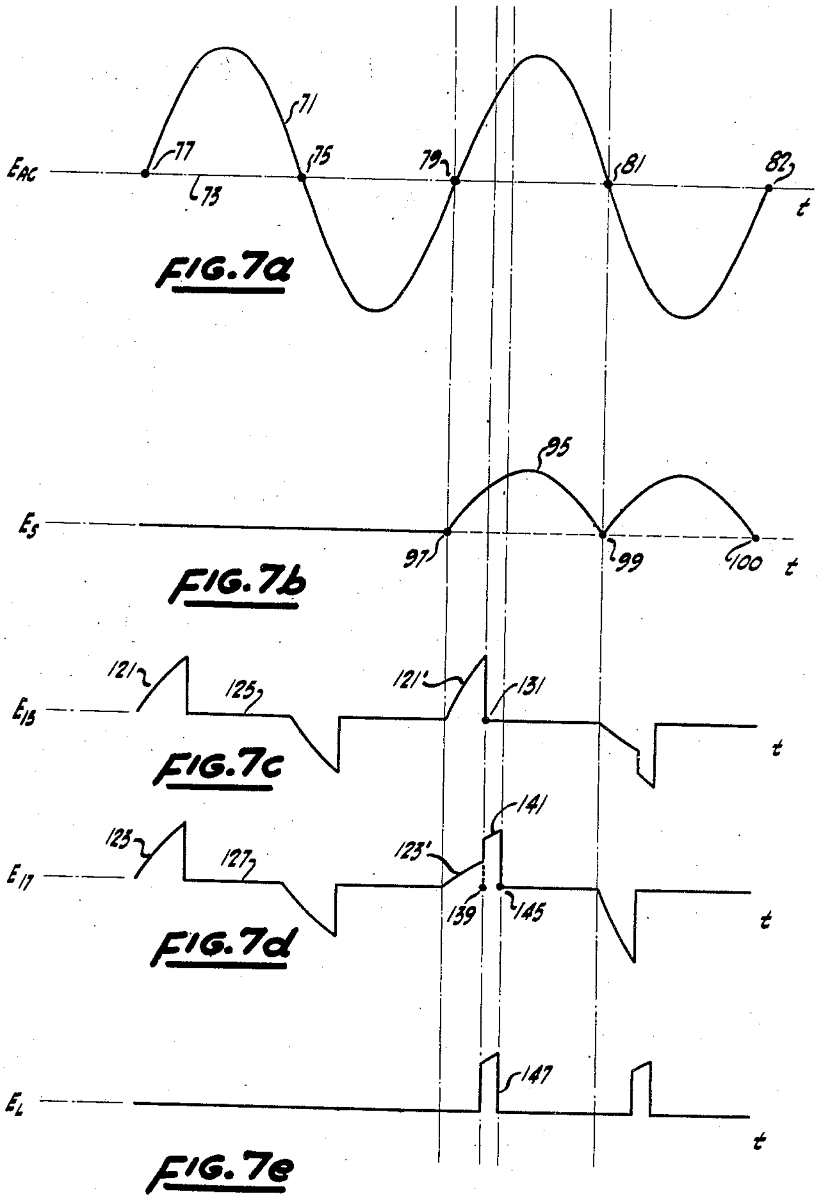
Figure 8:
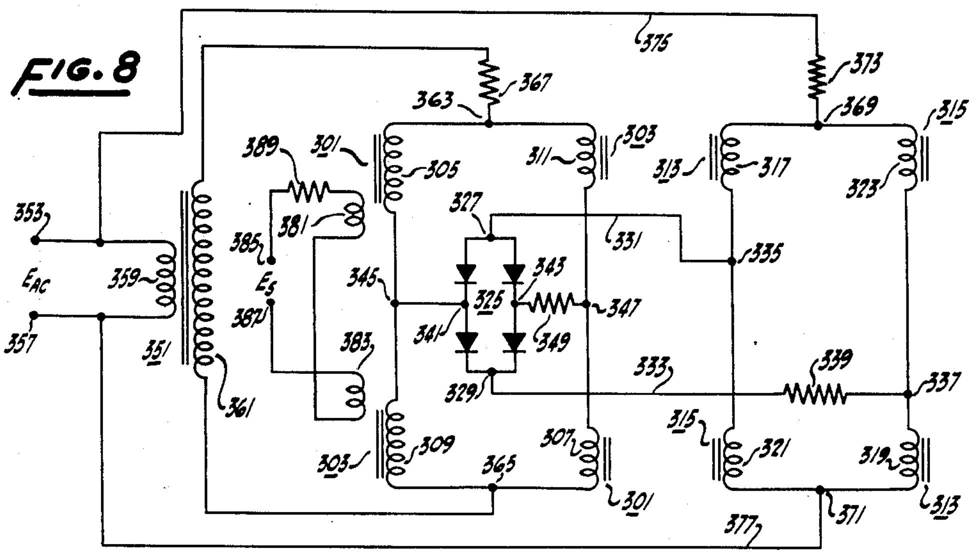
Figure 9:
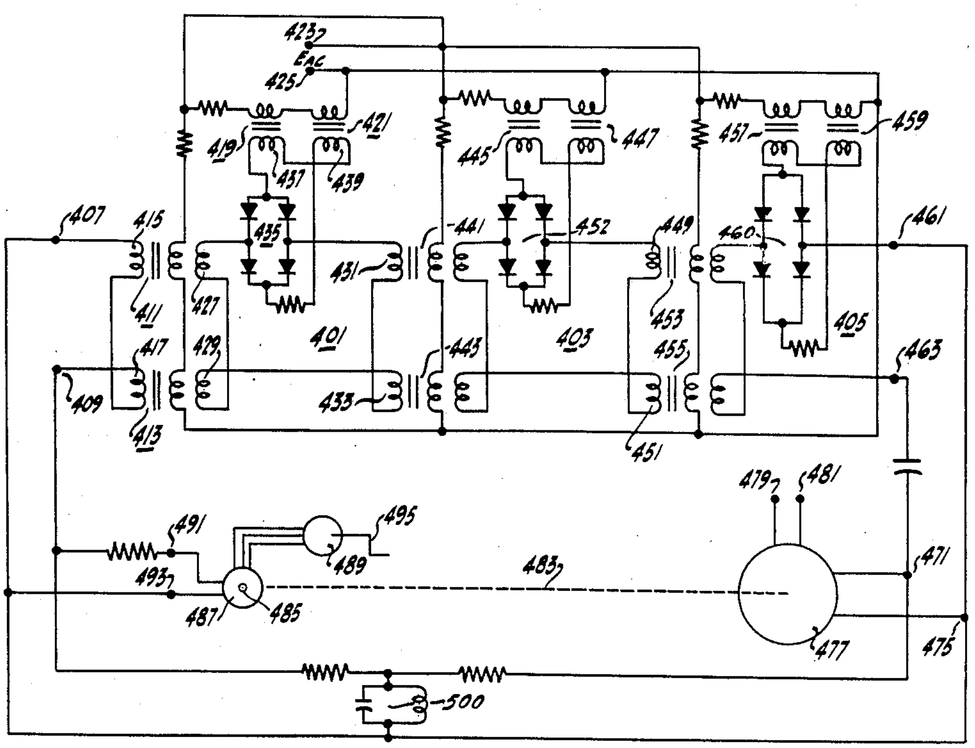
Figure 10:
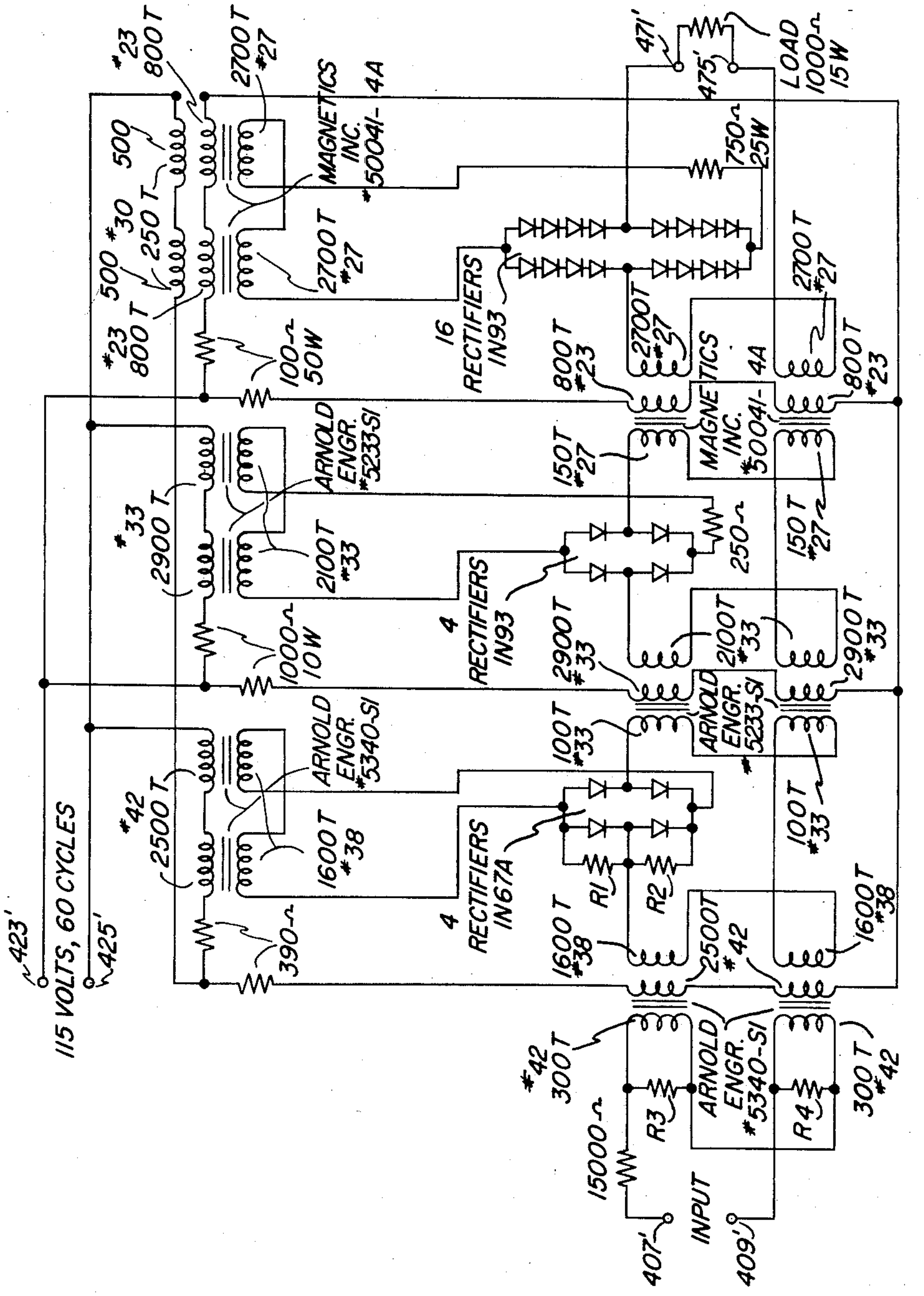

Figure 7*a* shows a typical wave form for the applied line voltage;

Figure 7*b* is one representation of a signal voltage wave form;

Figure 7*c* is a voltage wave form indicating the relative state of saturation of one of the cores of a given pair with respect to the signal and line voltages;

Figure 7*d* is a voltage wave form indicating the relative state of saturation of the other core of the pair with respect to the signal and line voltages;

Figure 7*e* is a voltage wave form showing the output to a load with respect to the line and signal voltages;

Figure 8 is a circuit diagram of a full wave bridge type magnetic amplifier operative in accordance with the principles of the present invention;

Figure 9 is a three-stage magnetic amplifier employing stages of the full wave type and illustrated as a control amplifier in a servo loop; and Figure 10 is a circuit diagram of a specific embodiment of the present invention with legends indicating the circuit parameters of the particular embodiment disclosed.

Figure 1:
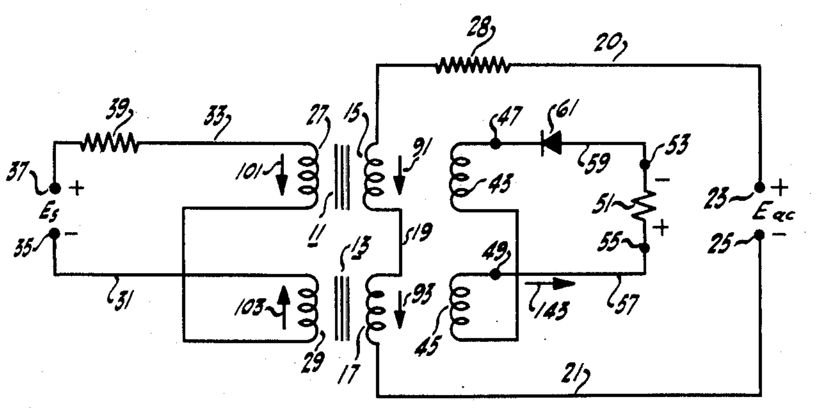
Figure 1 is a circuit diagram of a half wave type magnetic amplifier operative in accordance with the principles of the present invention.

The principle of operation of the device in accordance with the present invention is most easily understood from the simplified circuit diagram of Figure 1. The operation of the circuit of Figure 1 will first be described in connection with its application as a magnetic amplifier for alternating currents and secondly as a D. C. magnetic amplifier, these terms denoting, respectively, merely a signal of reversing polarity and a signal of single polarity. A first saturable core 11 is illustrated in accordance with electrical symbols in Figure 1, one suitable configuration being the toroid 11 shown in Figure 2. The core configuration is, of course, not restricted to the illustrated toroidal shape but the toroid does represent one convenient structure providing a magnetic path for establishing mutual coupling between a plurality of windings wrapped thereabout.

Figure 2:
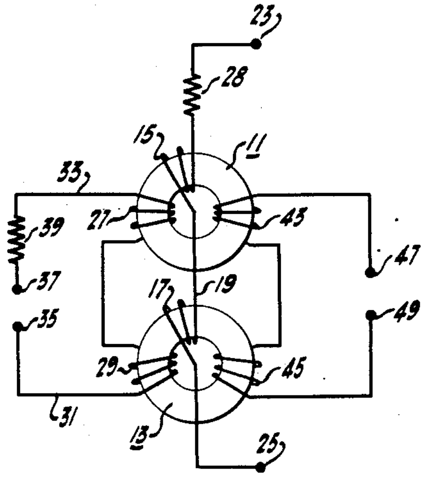
Figure 2 is a pictorial representation of suitable saturable core structures having associated windings thereon in accordance with the circuit diagram of Figure 1.

A second core 13, generally exhibiting similar magnetic characteristics to the first core, is also shown in the shape of a toroid in Figure 2. A line winding 15 is wrapped about the first core 11 and a further line winding 17 about the second core 13, the line windings being in series by way of a connection 19. It should be pointed out that although the line windings 15 and 17 are shown as separate windings, it will be apparent hereinafter that effectively the two windings in series comprise an equivalent single winding having turns wrapped about both of the cores 11 and 13. A pair of leads 20 and 21 extends respectively from the windings 15 and 17 to line input terminals 23 and 25, voltage absorbing means shown as the resistor 28 being connected in the lead 20. Signal windings 27 and 29 are respectively disposed on the cores 11 and 13 and are connected differentially, i. e., in series opposing relation. A pair of leads 31 and 33 extends from the windings 27 and 29 to signal input terminals 35 and 37, respectively. A protective impedance, shown as the resistor 39, is connected in lead 33 to limit current flow through the signal circuit, particularly after one or both cores are saturated. Although the resistors 28 and 39 are represented as separate components, it is to be understood that they may represent the resistance of windings with which they are in series.

A pair of output windings 43 and 45 is connected differentially, i. e., in series opposing relation with respect to the induced current flow therein occasioned by line current. The output windings 43 and 45 are respectively disposed on the cores 11 and 13 in the manner of the signal windings 27 and 29, the output windings having terminals 47 and 49, respectively.

The pictorial representation of Figure 2 shows the direction of wrapping of each winding on the cores 11 and 13 with respect to the other windings thereon. In reality the windings overlap and each winding may extend about the entire periphery of the toroids, but for simplicity of representation the windings are shown slightly spaced apart about the toroid perimeters.

A load for the magnetic amplifier of Figure 1 is represented by the resistor 51 connected between amplifier output terminals 53 and 55. A lead 57 is connected between the output terminal 49 associated with output winding 45 and the amplifier output terminal 55 and a further lead 59 extend from amplifier output terminal 53 via a switch, represented as a rectifier 61, to output terminal 47 of the other output winding 43.

A suitable line voltage is represented in Figure 7*a* as the A. C. wave 71, illustrated as symmetrical about the axis 73, although such symmetrical distribution about the axis is not essential according to the present invention. The horizontal axis 73 is measured in time and the vertical axis in voltage so that point 75 on the axis 73 represents the end of one half cycle of line voltage measured from point 77, and point 79 indicates the end of one cycle of line voltage. Regarding the A. C. wave 71, the prior art reset amplifier previously discussed relies upon the time interval between point 77 and point 79 to effect its cycle of operation, whereas in the ultra-fast amplifiers herein disclosed, the entire cycle of operation is effected within a half cycle or less of the A. C. wave 71, i. e., at least between the points 77 and 75. In the ultra-fast magnetic amplifier shown in Figure 1 and hereinafter referred to as an amplifier of the half wave type, the operation is such that an output is provided during the intervals measured between the points 77 and 75 and also between the points 79 and 81 when an A. C. signal of one phase with respect to the line voltage is applied between terminals 35 and 37. An A. C. signal of opposite phase will enable an output during the intervals 75 to 79 and 81 to 82. Therefore, the half wave designation is with respect to A. C. signals. However, when a D. C. signal is introduced between the input terminals 35 and 37, an output may be derived during each of the intervals 77—75, 75—79, and 79—81, etc.

It is well known that magnetic cores produce a changing magnetic flux when a voltage is applied to a winding supported on the core. If a voltage is applied to the winding for a sufficient period of time, the core may become magnetically saturated. The core becomes negatively magnetically saturated when a voltage of a first polarity is applied to the winding on the core for a particular period of time. The core becomes positively saturated when the same voltage of the opposite polarity is applied to the winding for the same length of time.

During the time that a core is not saturated, it produces increased amounts of magnetic flux, as a voltage of one polarity is applied. For certain core materials such as that used in the cores of this invention, small increases in current may cause large increases in the rate of change of magnetic flux. Since increases in rate of change of flux are equivalent to electromotive force—in other words, voltage—a large increase in voltage can be produced by a small increase in current (incremental magnetizing current) when the core remains unsaturated. This may be seen by the steep sides of the curve shown in Figure 3, such sides being designated as 92 and 94. Because of the large increase in voltage required to produce a small increase in current, the impedance presented by the winding may be relatively large during periods of core unsaturation. For example, each of the output windings 43 and 45 may have impedances of approximately 100,000 ohms when their associated cores remain unsaturated.

When a core becomes magnetically saturated, increases in current through its associated winding produce substantially no increase in magnetic flux. Because of the lack of any increase in flux in the core, no voltage is induced in the winding. This may be seen by the horizontally flat portions 96 and 98 in the hysteresis loop shown in Figure 3. Since impedance is represented by the ratio between the voltage and the current, the winding has substantially zero impedance when its associated core becomes saturated. For example, the winding 43 in Figure 1 presents a very low impedance when the core 11 becomes saturated.

The performance of a magnetic core at any instant is dependent upon certain characteristics of the core. For example, the performance of the core is dependent, among other factors, upon the cross-sectional area of the core and the magnetic material from which it is made. The characteristics of the core in turn determine how long a period of time is required to change the core from a negative saturation to a positive saturation or vice versa when a particular voltage is imposed on the winding associated with the core. Increases in voltage result in a decrease in the time required to change the polarity of core saturation. Similarly, increased periods of time are required to saturate a core for decreases in voltage applied to the associated winding.

Figure 3:
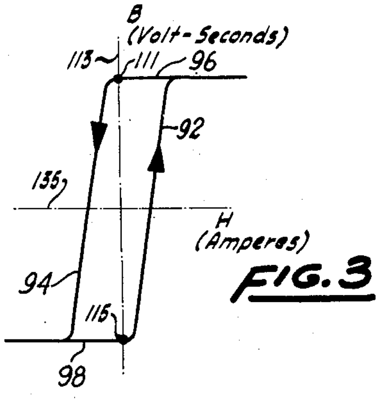
Figure 3 shows a typical hysteresis loop for either of the cores of Figures 1 or 2.

The combination of voltage and time required to convert a core from one polarity of saturation to the opposite polarity of saturation has been defined as the "volt-seconds capacity" of the core. The term "volt-seconds" can be mathematically described as the integral of voltage with respect to time. Thus, $$\text{Volt-seconds} = \int_0^t V dt$$

Where $V$=the voltage at any instant; and
$dt$=an infinitesimal increase in time from that instant Since the volt-seconds level of a core at any instant is dependent upon the value of the volt-seconds which have been applied through an associated winding previous to that instant, the curve shown in Figure 3 represents the relationship between current and volt-seconds. The value of the current is represented along the horizontal axis and the amount of volt-seconds is represented along the vertical axis. As will be seen in Figure 3, the portions 92 and 94 are relatively steep and the portions 96 and 98 are relatively flat such that a response curve approaching a rectangle is produced. Such a response curve is desirable for reasons which will become apparent in the subsequent discussion.

The operation of the amplifier of Figure 1 will be explained with reference to its application as an A. C. power amplifier of the half wave type, the A. C. signal (signal of reversing polarity) being introduced between signal terminals 35 and 37 and an A. C. line voltage such as that represented at 71 in Figure 7*a* being introduced between amplifier input terminals 23 and 25. Assuming that the alternating current wave 71 is traversing the half cycle between points 79 and 81 (Figure 7*a*) and that this polarity is indicated by a positive sign at terminal 23 and a negative sign at terminal 25, then the direction of current flow through line windings 15 and 17 is shown by arrows 91 and 93. If a signal, for example represented by the wave 95 shown in Figure 7*b*, is introduced between signal input terminals 35 and 37 such that the signal wave is traversing the interval between the points 97 and 99, the terminal 37 is marked by a positive sign and the terminal 35 by a negative sign, the direction of current flow through the signal windings 27 and 29 being represented by the arrows 101 and 103 which point in opposite directions. The direction of current flow here is the basis for stating that the signal windings 27 and 29 are connected differentially or in series opposing fashion, the currents flowing in the signal windings having opposite effects upon the cores 11 and 13. However, it will be noted that the current flow through signal winding 27 produces an effect on core 11 aiding that produced by the current flowing through line winding 15 whereas the effect produced on core 13 by the current flowing through signal winding 29 opposes that produced by the line current flowing through line winding 17.

Returning now to the hysteresis loop of Figure 3, the point 111 on the ordinate axis 113 represents the maximum number of volt-seconds in the upper or positive direction for the hysteresis loop which is an ordinate measure of positive saturation and the point 115 on the ordinate axis 113 in the negative direction indicates the maximum number of volt-seconds on the hysteresis loop which is negative saturation, the hysteresis loop being regarded as a typical loop for either of the cores 11 or 13. As has been stated previously, both cores are moved from positive to negative saturation, or vice versa, during each half cycle of the A. C. input wave 71. Since an arbitrary point (79 in Figure 7*a*) was assumed as a starting point to enable description of the operation, this point will be taken to correspond with point 111 on the hysteresis loop of Figure 3. It will be appreciated that during the interval between point 75 and point 79 on the A. C. wave 71 of Figure 7*a*, the cores 11 and 13 were moved from a state of negative saturation indicated by the ordinate point 115 in Figure 3 to a state of positive saturation indicated by the point 111.

As the line voltage, indicated by the wave 71 in Figure 7*a*, proceeds from point 79 toward point 81, the cores 11 and 13 follow the hysteresis loop from an ordinate level indicated by the point 111 downwardly in the direction of the left-hand arrow toward negative saturation indicated by the ordinate point 115. An increasing number of volt-seconds is transferred from the line windings 15 and 17 into the cores 11 and 13 because the area under the A. C. wave 71 increases with time during the half cycle measured between the points 79 and 81.

In the absence of any signal voltage at terminals 35 and 37, the cores 11 and 13 saturate at the same time as is indicated at the left in Figures 7*c* and 7*d* which respectively show the shape of the voltage across the line winding 15 ($E_{15}$) and the voltage across the line winding 17 ($E_{17}$). The voltage rise across winding 15 is indicated at 121 and the voltage rise across winding 17 at 123 in Figures 7*c* and 7*d*, respectively; the signal voltage ($E_s$) being zero during this time interval as is shown in Figure 7*b*. The cores are usually substantially uniform and the turns generally equal so that the voltage divides substantially evenly across the windings 15 and 17 and equal numbers of volt-seconds are applied to each of the cores 11 and 13. The line winding voltage waves 121 and 123 follow the shape of the applied line voltage wave 71 until saturation occurs at which time the impedance of the windings 15 and 17 drops so that the winding voltages fall to approximately zero and follow the axis 125 and 127, respectively, of the wave-shape diagrams of Figures 7*c* and 7*d*, the line voltage during this interval being absorbed across the resistor 28. Also, in the absence of signal voltage at terminals 35 and 37, the cores proceed to saturation (from ordinate point 111 to ordinate point 115) at substantially the same rate as is apparent from a comparison of Figures 7*c* and 7*d*.

The usual or ordinary situation above discussed is predicated upon the condition of zero output for zero input. In the event that an output is desired when the signal input is zero, the cores may be made dissimilar in material, configuration, or the number of turns in windings 15 and 17 may be made unequal.

The application of a signal voltage to the signal windings 27 and 29 affects the cores 11 and 13 differently due to the differential connection of the signal windings. For a given time interval, and assuming the polarity of Figure 1, a greater number of volt-seconds are transferred into core 11 than are transferred into core 13 and so core 11 saturates first. This is represented at point 131 in Figure 7*c*; the shape of the voltage wave 121 across line winding 15 prior to saturation being represented at 121'. The voltage wave 121' rises to a higher value than the voltage wave 121 because of the increased number of volt-seconds transferred to core 11 due to the signal current. Therefore, core 11 saturates in less time in the presence of signal voltage than in the absence of signal voltage, as is indicated by a comparison of the lengths of time axis beneath the wave shapes 121' and 121. Expressed another way, the rate of moving the core 11 from ordinate level point 111 on the hysteresis loop to ordinate level point 115 (i. e., from positive to negative saturation) has been increased.

The opposite effect is produced in core 13 because a comparison of the direction of current flow through signal winding 29 and line winding 17, as indicated by the arrows 103 and 93, makes it apparent that the effect of the signal current is opposing the effect of the line winding current with respect to the state of the core 13.

Resort may also be had to the hysteresis loop of Figure 3 to explain this action in terms of the core characteristics. When the current flow through signal winding 27 is in the same direction as the current flow through line winding 15, the effect is an increase current in so far as the state of core 11 is concerned. Hence, considering the illustrated hysteresis loop, core 11 moves to the left of the loop, i. e., establishes a different or wider hysteresis loop because of the effective current increase as seen along the abscissa 135 expressed in a quantity proportional to amperes. Core 13 moves to the right to establish a narrower hysteresis loop (within the area enclosed by the illustrated loop) due to the effective decrease in current. As core 11 moves to the left it also moves faster downwardly (toward negative saturation) because its rate of movement along the hysteresis loop has been increased, whereas core 13 moves to the right and downwardly at a decreased rate. If sufficient current is supplied to the signal windings, it is actually possible to reverse the direction of movement of core 13 along the loop. Particularly this is important in multistage amplifier action.

The operation may also be expressed mathematically in terms of the following voltage relation: $E_{15}+E_{17}=E_{ac}$ where $E_{15}$ represents the voltage across line winding 15, $E_{17}$ is the voltage across line winding 17 and $E_{ac}$ is applied line voltage appearing between terminals 23 and 25 (assuming a negligible voltage drop across resistor 28 due to magnetizing current). This is also apparent considering that prior to saturation of either core, the impedance of windings 15 and 17 is so high that the effect of resistor 28 may be neglected. Since the windings are represented as having equal numbers of turns, the line voltage may divide substantially evenly between the line windings. However, due to the nature of saturable cores the voltages across these windings may fluctuate in an uneven distribution. For zero signal input the uneven voltage distribution causes an induced voltage across signal windings 27 and 29. The resultant current flowing in the signal circuit automatically reduces the magnitude of the voltage unbalance.

Once core 11 saturates, a voltage determined by the relationship between the load and resistor 28 appears across line winding 17 to drive core 13 to saturation within the same half cycle of line voltage that caused saturation of core 11. This is indicated, in time, at point 139 on the time axis of Figure 7*d* where the voltage wave 123', across line winding 17, shifts to its maximum value indicated by the upper curved portion 141 which follows the shape of the applied line voltage curve 71. At the time indicated by point 139, an opposing voltage is induced across load winding 45 (according to transformer principles) to provide a current flow in the load circuit in the direction of the arrow 143. This current passes through the load represented by the resistor 51, since the rectifier 61 permits the current flow in this direction. The purpose of the rectifier is to prevent current flow through the load during the signal input interval. However, at point 145 on the time axis of Figure 7*d* core 13 becomes saturated because the increased line voltage across line winding 17, effective during the time interval between points 139 and 145 (power output interval), transfers sufficient volt-seconds to core 13 to drive it to negative saturation indicated by ordinate level point 115 in Figure 3. The resulting output produced in the time interval between saturation of core 11 and saturation of core 13 is shown in Figure 7*e* as a pulse 147 of load voltage $E_L$.

During the signal input interval (time integral of curve 121), the current supplied by the signal source is relatively small, since only incremental changes in the magnetizing current are necessary to produce the temporal separation between saturation of the cores prior to saturation of either core, assuming ideal rectifiers. Hence, the actual signal input power is small. After core 11 saturates the number of volt-seconds delivered to load resistor 51 will be equal to the volt-seconds difference between the cores at the time of saturation of core 11. The differential volt-seconds are delivered to load resistor 51 between core saturations. The power to the load is the instantaneous voltage squared divided by the load resistance, and the load is made small compared to resistor 39 in order to achieve power gain.

As previously described, the winding 43 presents a high impedance to the flow of output current before the saturation of the core 11 when current flows in the direction 101 through the input winding 27. Because of this high impedance, the core 11, its associated windings and the diode 61 serve as switching means. These switching means can be considered as being open until the saturation of the core 11. The switching means can be considered as closing upon the saturation of the core 11 to establish a low impedance path through the load 51. When the winding 43 presents a low impedance, the voltage induced in the winding 45 causes a relatively large output current to flow through a circuit including the load 51, the diode 61 and the windings 43 and 45.

For the circuit shown in Figure 1, a signal polarity opposite to that indicated will result in no temporal separation of the cores because the signal voltage during the signal input interval appears across output winding terminals 47 and 49. Normally the rectifier prevents current flow during the signal input interval, but for the opposite signal polarity, current will flow through the rectifier and the load and therefore signal voltage is substantially dissipated across resistor 39.

Considering the operation of the circuit of Figure 1 as an amplifier of D. C. signals, if during the next half cycle of line voltage (points 81—82, Figure 7*a*), signal voltage of the same polarity as was impressed during the first half cycle is impressed between signal terminals 35 and 37, the cores are subjected to the action outlined except that they are moved from negative to positive saturation, and core 13 saturates first.

Figure 4:
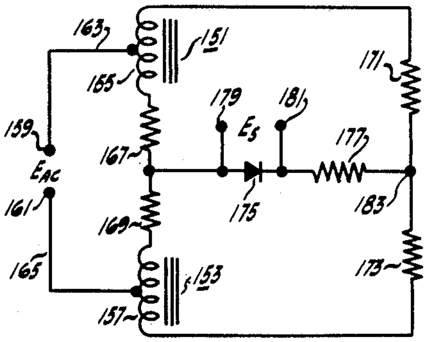
Figure 4 is a modified circuit diagram of a half wave type magnetic amplifier which may embody the principles of autotransformer action.

In Figure 4 there is shown a modified type half wave magnetic amplifier. The structure of Figure 4 includes a pair of saturable cores 151 and 153 having effectively a single winding shown as the series connected windings 155 and 157 wrapped thereabout. The line voltage is adapted to be applied to these windings between terminals 159 and 161, which terminals are connected by way of leads 163 and 165 tapped into windings 155 and 157 in the manner of an autotransformer. The windings 155 and 157 are connected together through voltage absorbing resistors 167 and 169 and also through a voltage divider comprising a pair of impedances herein represented as resistors 171 and 173. Between the junction of the resistors 167 and 169 and resistors 171 and 173 there is connected a rectifier 175 and a load shown also in the form of a resistor 177. A pair of terminals 179 and 181 is connected across the rectifier 175 to serve as signal input terminals. The impedances 171 and 173 have equal values so that the junction point 183 thereof is effectively at the electrical midpoint of the A. C. applied line voltage introduced between terminals 159 and 161. Obviously, a center tapped transformer could replace the resistors 171 and 173. The signal voltage applied at terminals 179 and 181 causes a current to flow through windings 155 and 157 in such a manner as to aid the line current through one of these windings and oppose the line current through the other winding, thereby effecting the temporal separation between the times of core saturations. As a result of the temporal separation of the times of saturation of the cores a power interval is established and current is caused to flow through the load 177 in the same manner as was explained in detail in connection with the description of Figure 1.

Figure 5:
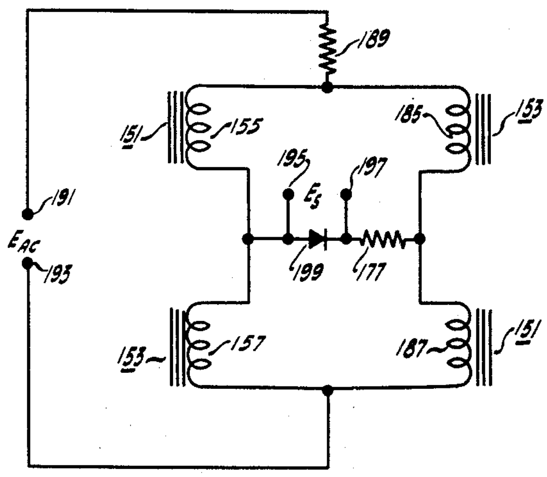
Figure 5 is a circuit diagram of a bridge type magnetic amplifier operative in a manner similar to the half wave type amplifier of Figure 4.

The circuit diagram of Figure 4 may be regarded as a quasi-bridge type circuit and, as shown in Figure 5, may easily be converted for bridge operation by substituting a winding 185 (similar to winding 157 and located about the core 153) for the resistor 171 and a winding 187 (similar to winding 155 and located about the core 151) for resistor 173. The voltage absorbing resistors 167 and 169 are then combined as a single resistor 189 in series with the line input terminals 191 and 193, a signal voltage being applied between terminals 195 and 197 disposed across rectifier 199. When either core saturates prior to the saturation of the other as a result of the differential application of signal voltage in the manner hereinbefore described, current flows through the windings of the saturated core to deliver power to the load 177, assuming proper polarity with respect to current flow through rectifier 199. Load current is established when signal input terminal 195 is negative regardless of the line polarity at terminals 191 and 193.

Figure 6:
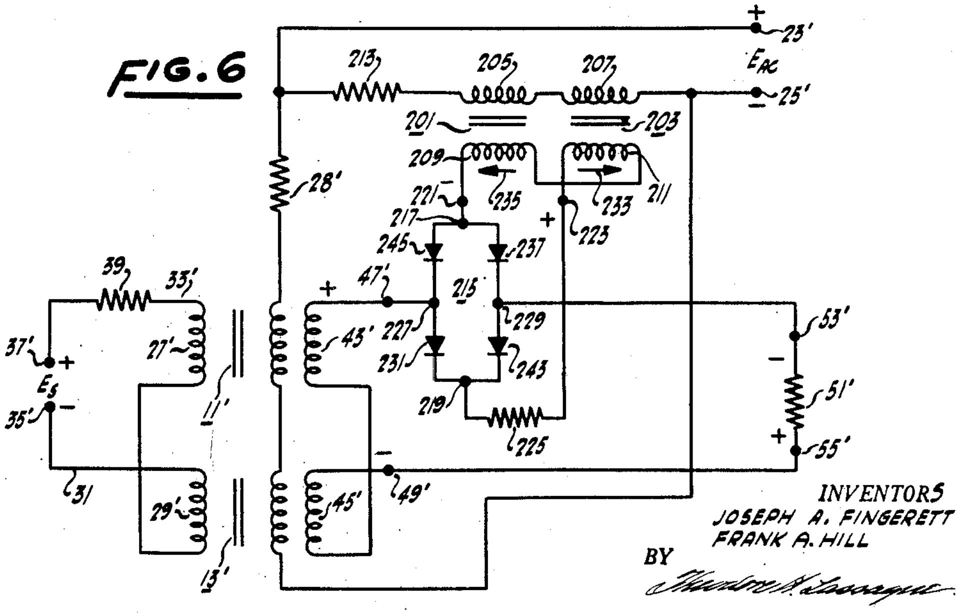
Figure 6 is a circuit diagram of a full wave type magnetic amplifier also operative in accordance with the principles of the present invention.

It may now be appreciated that suitable switching means for preventing current flow into the load (resistor 51, Figure 1) during the signal input interval and permitting current flow during the power output interval would permit signals of either polarity to produce corresponding outputs. The circuit of Figure 6 represents an arrangement capable of effecting the foregoing. The components in the portion of the circuit corresponding to the circuit of Figure 1 are identified by the primes of the numbers used in the description of Figure 1. For this portion of the circuit the operation is the same as previously described. The added components perform the switching function.

Specifically it is desired to present a high impedance between the output winding terminals 47' and 49' and the amplifier output terminals 53' and 55' during the signal input interval and a low impedance during the power output interval. For a signal input of a given polarity, the rectifier 61 of Figure 1 serves this purpose. In the circuit of Figure 6 the foregoing is accomplished regardless of the polarity of the signal input.

An additional pair of saturable cores 201 and 203, usually similar to the cores 11' and 13', are respectively provided with line windings 205 and 207, and output windings 209 and 211 connected in the same manner as the corresponding windings on cores 11' and 13'. The line windings 205 and 207 are connected in series across input terminals 23' and 25' through a further voltage absorbing resistor 213 usually of the same value as resistor 28'. A full wave rectifier bridge 215 has its D. C. terminals 217 and 219 connected between terminals 221 and 223 of output windings 209 and 211 through a dummy load represented by the resistor 225. The A. C. terminals 227 and 229 of the bridge 215 are connected between terminal 47' of the output winding 43' associated with core 11' and amplifier output terminal 53'.

The operation of the circuit of Figure 6 will be first described with a signal voltage applied to terminals 35' and 37' of the polarity assigned on the drawing ("+" on 37'). During the signal input interval, the signal voltage appearing across the signal windings 27' and 29' appears across output windings 43' and 45'. The same voltage also appears between terminals 221 and 223 in the polarity indicated because of the current flow through rectifier 231, load 225, output windings 211 and 209 in the direction indicated by the arrows 233 and 235, rectifier 237 and load 51'. This current is the incremental magnetizing current for cores 201 and 203 because these cores are in the same relative states as cores 11' and 13'. Since during the signal input interval the cores 201 and 203 are also unsaturated, only incremental magnetizing current can flow and therefore windings 209 and 211 present a high impedance across terminals 47' and 49'. Therefore, the signal source (not shown) need only provide incremental magnetizing current for core pair 11' and 13', assuming ideal rectifiers, as in the case of Figure 1 and also incremental magnetizing current for core pairs 201 and 203. The voltage drop across the load and dummy load is small compared to the voltage between terminals 221 and 223. As a result of the same signal voltage appearing across the pair of windings 27' and 29' and the pair of windings 209 and 211 and the opposite effects produced upon the associated cores by the current through the differentially connected windings, the rates of saturation of cores 201 and 203 are affected differentially in the manner of cores 11' and 13' so as to cause one of the cores 201 and 203 to saturate at the same time that one of the cores 11' and 13' saturates. For the polarity shown, this is core 203. Subsequent to the saturation of the core 203, the induced voltage across winding 209 is of the polarity to cause current flow through the bridge from terminal 217 to 219 effecting a low impedance path between A. C. terminals 227 and 229 of the bridge. This effect is maintained until core 201 saturates. Also, when core 203 saturates, core 11' saturates so that the induced voltage across winding 45 of core 13' establishes current flow to the load 51' since the low impedance path is effected between bridge terminals 227 and 229.

For the same line polarity indicated in Figure 6, the application of a signal of opposite polarity to that indicated would cause core 13' to saturate prior to core 11' thereby providing current flow through the load 51' of polarity opposite to that indicated. During the signal input interval, the voltage across terminals 47' and 49' would also be reversed from the polarity indicated. The path of the resulting current would be through the load 51', rectifier 243, dummy load 225, output windings 209 and 211 in the same direction as produced by a signal of the former polarity (indicated direction) and through rectifier 245. Therefore, core 203 saturates at the same time as core 13' for this situation.

When the line voltage polarity is reversed, the direction of signal current flow through windings 209 and 211 remains unchanged, so core 201 saturates first in the event of a signal voltage of either polarity effecting the low impedance path between A. C. terminals 227 and 229 as before. For this condition if the signal polarity is reversed, only the order of saturation of cores 11' and 13' is affected to change the polarity of the output across load 51'.

The circuit of Figure 8 shows a magnetic amplifier of the full wave type incorporating the bridge circuitry of Figure 5 and otherwise operating in accordance with the full wave operation explained in connection with the circuit of Figure 6. A pair of cores 301 and 303 are provided with line windings 305 and 307 wrapped about core 301 and line windings 309 and 311 disposed on core 303 in the manner of the windings and cores illustrated in Figure 5. A second pair of cores 313 and 315, respectively, have line windings 317 and 319 wrapped about core 313, and line windings 321 and 323 wrapped about core 315 to perform the function of the windings on the cores identified at 201 and 203 in Figure 6. A full wave bridge rectifier 325 has its D. C. terminals 327 and 329 connected by way of leads 331 and 333 across the bridge circuit formed by the windings on the saturable cores 313 and 315 at points 335 and 337 and by way of a dummy load 339. The A. C. terminals 341 and 343 of the rectifier bridge 325 are connected across the bridge circuit comprising the windings on the cores 301 and 303 at points 345 and 347 by way of a load illustrated as a resistor 349.

Line voltage is introduced to a line transformer 351 at terminals 353 and 357, the primary winding 359 supplying a secondary winding 361 which provides the line input to the bridge circuit associated with cores 301 and 303 at input terminals 363 and 365 by way of a voltage absorbing resistor 367. The other bridge circuit associated with cores 313 and 315 receives its line input at terminals 369 and 371 by way of a voltage absorbing resistor 373 and a pair of connections 375 and 377 which extend directly to the transformer input circuit. As in the case of the signal windings 27' and 29' of the circuit of Figure 6, the signal is introduced differentially into the circuit of Figure 8 by way of signal input windings 381 and 383 which extend to signal input terminals 385 and 387 by way of the so-called protective impedance or resistor 389. As a result of the differential rate established in the core pair 301 and 303 caused by the application of the signal, a similar differential rate is induced in core pair 313 and 315 in the same manner as described in connection with the circuit of Figure 6. Consequently, at the time of the saturation of the first core in pair 301 and 303, one core in the pair 313 and 315 will saturate. The saturation of the first core in pair 313 and 315 acts in the manner hereinbefore explained to provide a low impedance path between the A. C. terminals 341 and 343 of the rectifier bridge 325 to permit power transfer to the load 349. Also, as was set forth in connection with the description of Figure 6, the amplifier of Figure 8 will accept signals of either polarity applied between terminals 385 and 387 during the signal input interval of either half cycle of line voltage introduced across terminals 353 and 357 to deliver output across load 349. Hence it may be appreciated that in the circuit of Figure 8 a bridge type magnetic amplifier is used to provide the switching function for a second bridge type magnetic amplifier enabling the second amplifier to operate in the manner of a full wave amplifier.

In the circuit of Figure 9 there is shown a magnetic amplifier having three stages generally indicated, respectively, at 401, 403 and 405. Each of the stages operates in accordance with the principles explained in connection with the description of Figure 6 except that the output from stage 401 is now used as the input to stage 403 and the output from stage 403 becomes the input to stage 405. As has been mentioned, this action occurs within one half cycle of the line voltage and may occur during each consecutive half cycle in the presence of the signal.

The input interval for stage 403 is of greater time duration than the input interval for stage 401, and the input interval for stage 405 is of greater time duration than the input interval for stage 403. This is because the output interval for stage 401 must necessarily correspond in time with at least a portion of the input interval for stage 403, and this is true for each succeeding stage regardless of the number of stages.

It has been previously pointed out that the output interval of a given stage of amplification immediately succeeds the input interval for that stage. This sequence of operation enables an output from stage 401 to be effective as an input to stage 403 and similarly with respect to successive stages.

Assuming an input signal applied between terminals 407 and 409, a temporal separation is effected between the times of saturation of cores 411 and 413 due to the differential application of signal energy by way of signal windings 415 and 417. A similar temporal separation is established between the saturation times for cores 419 and 421. One of the cores in the pair 419 and 421 saturates at the same time that saturation occurs in one of the cores 411 and 413, this time being established relatively early in any half cycle period of line frequency. This action may be expressed in terms of volt-seconds supplied by the line voltage applied at terminals 423 and 425. Since the line voltage must be sufficient to cause all of the cores of the multi-stage magnetic amplifier to be driven to saturation during each half cycle, only a portion of the volt-seconds is used in causing saturation of the cores of the first stage. This is usually a relatively small portion of the total line volt-seconds per half cycle. When one of cores 419 and 421 saturates, a low impedance path is provided between output windings 427 and 429 of stage 401 and the input windings 431 and 433 of stage 403, the full wave bridge rectifier 435 functioning in the manner heretofore described as a result of the saturation of one of the cores 419 and 421 and the induced voltage appearing across one of the associated output windings 437 and 439.

The input windings 431 and 433 for stage 403 are connected to affect the cores 441 and 443 differentially so as to effect a temporal separation in the saturation times of these cores, since neither of cores 441 and 443 has reached saturation during the operation above described. The same temporal separation is effected between the times of saturation of cores 445 and 447. When saturation of one of the cores 441 and 443 occurs due to the output of stage 401 being applied as the input to stage 403, saturation is established in one of the cores 445 and 447 to effect a low impedance path to the input windings 449 and 451 (by way of rectifier bridge 452) for stage 405 associated with cores 453 and 455. Since at this time in the half cycle, neither of these cores is saturated, the delivered signal is capable of effecting a temporal separation in the times of saturation of the cores 453 and 455. Again at about the same time that one of the cores 453 and 455 saturates, one of the cores 457 and 459 is driven to saturation to provide a low impedance path via rectifier bridge 460 to amplifier output terminals 461 and 463. The output of the multi-stage amplifier of Figure 9 appearing at terminals 461 and 463 is dependent upon the input applied at terminals 407 and 409 and occurs during the same half cycle of line voltage. It is noted that this output is independent of any input applied to the amplifier during the preceding half cycle of line voltage.

Many factors are capable of determining the time of saturation of the cores in each stage. These factors include the cross-sectional area of the core structure, the number of turns comprising the line windings, and the saturation characteristics of the core material used. For example, the cross-sectional dimensions of the cores may increase in successive stages, thereby enabling saturation to occur at later points in a given half cycle.

The magnetic amplifier illustrated in Figure 9 is shown applied as a control amplifier for a servo loop wherein the output appearing across terminals 461 and 463 is applied to the control phase (indicated at terminals 471 and 475) of a two-phase motor 477 supplied with line voltage at terminals 479 and 481. A mechanical connection is indicated by the dotted line 483 between the rotor (not shown) of the two-phase motor 477 and a rotatable shaft 485 of a control transformer 487. The control transformer is supplied with electrical input from a synchro-transmitter 489 such that the output of the control transformer at terminals 491 and 493 will be zero if the angular orientation of the rotatable shaft 485 corresponds to the angular orientation of the input shaft 495 of the synchro-transmitter 489. Otherwise, an error voltage appears across terminals 491 and 493 and is applied as the input to the multi-stage magnetic amplifier across terminals 407 and 409. The resultant amplified output applied to the control phase at terminals 471 and 475 will cause an angular rotation of the rotor of the two-phase motor 477 and a corresponding angular rotation of the control transformer rotatable shaft 485 in such a direction as to cause the output voltage of the control transformer at terminals 491 and 493 to decrease. A resonant circuit 500 is included in the servo loop for anti-hunting purposes following conventional practice.

Figure 10 is a circuit diagram of an embodiment of the present invention which has been actually constructed and successfully operated. In this figure, which corresponds with the embodiment of Figure 9 with the exceptions hereinafter indicated, the primes of the reference numerals applied to the line voltage terminals, signal input terminals, and load terminals of Figure 9 have been applied, and legends have been applied to the several circuit components giving their specific characteristics.

The resistances of the resistors corresponding to those appearing in Figure 9 are indicated in ohms in Figure 10. The power rating of certain of the indicated resistors is indicated in watts. The various coils corresponding to those shown in Figure 9 are identified by legends indicating the wire size and number of turns, e. g., number 42 indicating wire of 42 Brown & Sharpe gauge and the legend "2500T" indicating 2500 turns of this wire. The identification of the 1N67A rectifiers is the RTMA type numbers of Hughes germanium diodes described in a bulletin published March 1, 1953, by the Hughes Aircraft Company of Culver City, California. Those of the 1N93 rectifiers are the type numbers of General Electric Co. germanium diodes described at page 43A of proceedings of the I. R. E. for September 1953.

The magnetic cores designated "Arnold Eng. #5233–S1" are those so designated in a bulletin of the Arnold Engineering Co. of Marengo, Illinois, designated TC–101A published March 15, 1953, being described therein as cores of one mil "Supermalloy" having an O. D. of 1.500 inches; an I. D. of 1.000 inch; and a height of 0.375 inch; and being of a minimum weight of 37.0 grams. The cores designated Arnold Eng. #5340–S1 are those described in the same bulletin as being of an O. D. of .750 inch, an I. D. of 0.500 inch; and a height of 0.125 inch; and as having a minimum weight of 3.09 grams. The cores designated "Magnetics, Inc." #50041–4A are those described in Standard Specifications and Size Sheets published by Magnetics, Inc. of Butler, Pennsylvania, under date of August 1, 1952, as being of 4 mil "Orthonol" and as having an I. D. of 2.000 inches; an O. D. of 2.500 inches; and a height of 1.000 inch.

Since it is inconvenient to make the small first stage of this amplifier operate on a conventional line voltage of the order of 115 volts A. C. 60 cycles, because to do so would require a great many turns of extremely small wire, the circuit diagram of Figure 10 provides for the application of a smaller voltage (36 volts A. C. 60 cycles) to the first stage. This smaller voltage is obtained from additional windings 500 applied to the switching cores of the last stage corresponding to the cores 457 and 459, respectively, of Figure 9. These windings simply serve as a step-down transformer to provide a lower line voltage to the first stage with no degrading of the other functions of the last stage cores.

Because small differences in characteristics between cores create a tendency to emit an A. C. output in the absence of any A. C. input, means are provided in the circuit of Figure 10 for correcting such core unbalance. This is accomplished, as shown in Figure 10, by the insertion of resistors shunting the signal windings corresponding to the windings 413 and 415 of Figure 9; the effect of these resistors being to introduce an A. C. signal of the proper amplitude and phase to cancel the unwanted output. Inserting one of these resistors, if it is made to have a sufficiently small impedance, will introduce an A. C. output; the smaller the resistance, the larger the output. Inserting the other resistor will have the same effect except that the induced A. C. output will be of the opposite phase. Both resistors may be inserted and the ratio of their resistances adjusted to cancel a small A. C. output. If both resistors are inserted and both resistances made small, the input impedance of the magnetic amplifier will be reduced, and hence the gain will be reduced. However, greater stability of output against changes of temperature and the like will be achieved. Typical values for the resistors designated R–3 and R–4 in Figure 10 range from 4000 ohms to 20,000 ohms.

Due to slight differences in the back impedance of rectifiers and to differences in characteristics of cores, a small D. C. output will sometimes be observed in the absence of any D. C. input. This may be corrected by shunting the highest impedance rectifier by a resistance such as that designated R–1 or R–2 in Figure 10. For greater stability against variations of rectifier back impedance, both R–1 and R–2 may be inserted and the ratio of their resistances adjusted to give approximately zero D. C. output for zero D. C. input. The smaller these resistors are made, the greater the stability and the less the gain will be. Typical values for the resistors R–1 and R–2 range from 0.1 to 0.5 megohm.

It will be understood that in cases of extreme differences between core characteristics and between rectifier characteristics, resistors may be inserted in the second and third stages in the same manner as the resistors R–1, R–2, R–3 and R–4 are illustrated as applied to the first stage. It will likewise be understood that the advantages gained from the insertion of these resistors can well offset the disadvantages, since performance never can be quite as good from a poorly balanced magnetic amplifier as from one that is well balanced.

What is claimed is:

1. A magnetic power amplifier comprising a pair of saturable cores, a pair of connected line windings respectively disposed on said cores, terminals for the line windings whereat alternating line voltage is introduced thereto; the volt-seconds capacity of the wound cores being so related to the line voltage as to insure saturation of each core during each half cycle of applied line voltage, means for introducing signal energy differentially to the cores in particular alternations of the line voltage to provide a temporal separation of the core saturations in those alternations, an output circuit, and means controlled by the saturable cores for establishing a high impedance path to the output circuit for power transfer prior to saturation of either of the cores in the successive alternations of the line voltage, said last mentioned means being responsive to the saturation of the first of the cores to saturate in the particular alternations of the line voltage to establish a low impedance path to the output circuit for a transfer of power in the same alternations as the introduction of the signal energy and for a transfer of the power without any retention of signal energy in the cores from the particular alternations of line voltage to the next alternations.

2. A mganetic power amplifier comprising a pair of saturable cores exhibiting similar magnetic characteristics, a pair of series connected line windings respectively disposed on said cores, terminals connected across the line windings whereat alternating line voltage is introduced thereto, the volt-seconds capacities of the wound cores being so related to the magnitude of applied line voltage as to insure saturation of each core during each half cycle of applied line voltage, means for introducing signal energy differentially to the cores in respect to the influence of the line voltage thereon in particular half cycles of the line voltage to provide a temporal separation of the times of core saturations in those half cycles of the line voltage, an output circuit, and means controlled by the saturable cores for establishing a high impedance path to the output circuit for line and signal power prior to saturation of either of the cores, said last mentioned means being responsive to the saturation of the first of the cores to saturate to establish a low impedance path to the output circuit in the same half cycle as the introduction of the signal energy for the production in the output circuit of a power amplification greater than unity as a result of the signal energy introduced in that half cycle and relative to such signal energy and without any retention of signal energy in the cores from that half cycle to the next half cycle.

3. The magnetic power amplifier of claim 2 wherein the means establishing a high impedance path to the output circuit includes a rectifier connected to pass a unidirectional current in the output circuit.

4. A magnetic amplifier having a reversible cycle of operation, each cycle corresponding in duration to a half cycle of the line current supplied thereto, comprising a pair of saturable cores, cyclically operable means for alternately saturating both of said cores first in one direction and then in the opposite direction including means simultaneously exposing said cores to flux produced by an alternating line current, means for effecting a temporal separation of the saturations of said cores in particular alternations of the line current including means for exposing at least one of said cores to flux produced by a signal current, and switching means controlled by the saturable cores for operating in synchronism with each saturation of one of said cores for obtaining the delivery of output current from said amplifier within the same half cycle of the line current as the introduction of the signal current and without any transfer in the cores of signal energy produced by the signal current from that half cycle of the line current to the next half cycle of the line current.

5. A magnetic amplifier having a reversible cycle of operation, each cycle of operation occurring during a half cycle of the line current supplied thereto comprising a pair of saturable cores, cyclically operable means for alternately saturating both of said cores first in one direction and then in the opposite direction including means simultaneously exposing said cores to flux produced by an alternating line current, means for effecting a temporal separation of the saturations of said cores in each alternation of the line current including means for exposing at least one of said cores to flux produced by a signal current, and switching means controlled by the saturable cores for operating in synchronism with each saturation of the first of said cores to saturate to obtain the delivery of output current from said amplifier in the same half cycle of the line current as the signal current producing the temporal separation in the saturation of the cores and for producing such output current until the saturation of the other core in the pair in that half cycle of the line current and for producing an output current having an amplitude for obtaining a gain in power output in that half cycle relative to the power input provided by the signal current in that half cycle.

6. A multi-stage magnetic amplifier wherein each stage comprises a pair of saturable cores, a pair of series connected line windings respectively disposed on said cores, terminals for the line windings whereat alternating line voltage is introduced thereto, the volt-seconds capacities of the wound cores being so related to the line voltage as to insure saturation of each core during each half cycle of applied line voltage, means for introducing signal energy differentially to the cores in particular alternations of the line voltage to provide a temporal separation of the core saturations in each pair in those alternations, an output circuit, and means controlled by the saturable cores for establishing a high impedance path to the output circuit for line and signal power prior to saturation of either of the cores, said means being responsive to the saturation of the first of the cores to saturate to establish a low impedance path to the output circuit for the production of output energy in the output circuit in the same alternations of the line voltage as the introduction of the signal energy and without any retention of signal energy in the cores from those alternations of the line current to the next alternations; the volt-seconds capacities of the wound cores of successive stages being so related to the magnitude of the line voltage as to cause the cores of successive stages to saturate in successive order in the same alternations of the line voltage for the establishment of a low impedance path to the following stage in those alternations of the line voltage prior to the saturation of either core in the following stage in those alternations of the line voltage.

7. A magnetic power amplifier, including, a first saturable core, a second saturable core, cyclically operable means including means for simultaneously exposing the cores to flux produced by an alternating line current for alternately producing core saturation initially in one direction and then in the opposite direction in each alternation of the line current, means for producing a saturation of one of the cores before a saturation of the other core in particular alternations of the line current including means for exposing the cores to flux produced by a signal current, a load, and circuit means including the load for providing for the delivery to the load, in the same alternation of the line current as the introduction of the signal current and upon the saturation of one of the cores in that alternation of the line current and until a saturation of the other core in that alternation of the line current, of output current to provide in that alternation of the line current a power output greater than the power input introduced by the signal current in that alternation.

8. A magnetic power amplifier, including, a first saturable core, a first line winding magnetically associated with the first core, a first output winding magnetically associated with the first core, a second saturable core, a second line winding magnetically associated with the second core, a second output winding magnetically associated with the second core, means for providing for the introduction of alternating line voltage to the first and second line windings, means for introducing signal energy differentially to the line windings relative to the introduction of line voltage to the windings and in particular alternations of the line voltage to produce a saturation of one of the cores before any saturation of the other core during the particular alternations of the line voltage, and an output circuit connected to the output windings to produce power amplification of the signal energy upon the saturation of one of the cores and until a saturation of the other core in the particular alternations of the line voltage and in the same alternations of the line voltage as the introduction of the signal energy and without any retention of signal energy from those alternations of the line voltage to the next alternations.

9. A magnetic power amplifier, including, a first saturable core, a line winding magnetically associated with the core, an output winding magnetically associated with the core, a second saturable core, a second line winding magnetically associated with the second core, a second output winding magnetically associated with the second core, means for providing for the introduction of alternating voltage to the line windings, means for introducing signal energy differentially to the line windings relative to the introduction of line voltage to the windings in particular alternations of the line voltage to produce a temporal separation of the core saturations during the particular alternations of the line voltage, a load, unidirectional means, and an output circuit including the load, the unidirectional means and the output windings for producing a power amplification greater than unity of the signal energy during the temporal separation of the core saturations and during the same alternation of the line voltage as the introduction of the signal energy.

10. A magnetic power amplifier, including, a first saturable core, a second saturable core, a first line winding magnetically associated with the first core, a first input winding magnetically associated with the first core, a first output winding magnetically associated with the first core, a second line winding magnetically associated with the second core, a second input winding magnetically associated with the second core, a second output winding magnetically associated with the second core, means for introducing alternating line voltage to the first and second line windings, means for introducing signals of opposite polarities to the first and second input windings relative to the introduction of line voltage to the line windings in particular alternations of the line voltage to produce a saturation of one of the cores before any saturation of the other core in the particular alternations of the line voltage, an output circuit including a load and unidirectional means in series with the first and second output windings for producing an output current upon the saturation of one of the cores and until a saturation of the other core in the particular alternations of the line voltage and in the same alternation of the line voltage as the introduction of the signals to the input windings for the production in the load in that alternation of the line voltage of output energy greater than the input energy introduced by the signals in that alternation.

11. A magnetic power amplifier, including, a first pair of saturable cores, a second pair of saturable cores, cyclically operable means including means for simultaneously exposing the cores to flux produced by an alternating line current for alternately producing core saturation initially in one direction and then in the opposite direction, means for effecting a temporal separation of the saturation of the cores in each pair in particular alternations of the line current including means for exposing the cores to flux produced by a signal current, a load, and means including the load for operating in synchronism with the saturation of at least one of the cores in the first pair and in the second pair in the same alternations of the line current as the introduction of the signal current to obtain the delivery of output current in those alternations of the line current until the saturation of the second core in the first pair in those alternations for a transfer to the load on an amplified basis in those alternations of the line voltage of all of the energy resulting from the introduction of the signal current during those alternations of the line voltage.

12. A magnetic power amplifier, including, a first pair of saturable cores, a second pair of saturable cores, cyclically operable means including means for simultaneously exposing the cores to flux of the same polarity for the production of core saturations initially in one direction and then in the other, signal means for differentially producing flux in each pair of cores to provide a saturation of one of the cores in each pair before any saturation of the other core in the pair in particular half cycles from the cyclically operable means, a load, and circuit means including the load for providing a relatively low impedance to the load upon the saturation of one of the cores in the first pair and in the second pair for the delivery of output current through the load in the same half cycle as the introduction of energy from the signal means and until the saturation of the second core in the first pair in that half cycle from the cyclically operable means to obtain an output in the load without any transfer from one half cycle to the next of any memory resulting from the introduction of signal current in that half cycle.

13. A magnetic power amplifier, including, a first pair of saturable cores, a second pair of saturable cores, a first pair of line windings each being magnetically associated with a different one of the cores in the first pair, a second pair of line windings each being magnetically associated with a different one of the cores in the second pair, a first pair of output windings each being magnetically associated with a different one of the cores in the first pair, a second pair of output windings each being magnetically associated with a different one of the cores in the second pair, means for introducing cyclic line voltage to each of the line windings, means for introducing signals of opposite polarities to the line windings in each pair relative to the polarities of the cyclic line voltage introduced to the windings in particular half cycles of the line voltage to produce a saturation of one of the cores in each pair before any saturation of the other core in the pair, a load, unidirectional means, and an output circuit including the load, the unidirectional means and the output windings in the first and second pairs and operative to deliver an output current to the load in the same half cycle as the introduction of the signals to the windings and upon the saturation of one of the cores in each of the first and second pairs in that half cycle of the line voltage and until the saturation of the second core in the first pair in that half cycle of the line voltage and operative to utilize all of the energy introduced by the signals to the line windings in that half cycle of the line voltage for the prevention of any memory in the circuit from that half cycle of the line voltage to the next half cycle.

14. A magnetic power amplifier, including, a first pair of saturable cores, a first pair of line windings each being magnetically associated with a different core in the first pair, a first pair of output windings each being magnetically associated with a different core in the first pair, a second pair of saturable cores, a second pair of line windings each being magnetically associated with a different core in the second pair, a second pair of output windings each being magnetically associated with a different core in the second pair, means for providing for the introduction of alternating line voltage to the line windings in each pair, means for introducing signal energy differentially to the line windings in each pair relative to the introduction of line voltage to the windings in particular alternations of the line voltage to produce a saturation of one of the cores in each pair before any saturation of the other core in the pair during the particular alternations of line voltage, and an output circuit connected to the output windings to produce a power amplification greater than unity of the signal energy in the same alternation of the line voltage as the introduction of the signal energy and upon the saturation of one of the cores in each pair and until the saturation of the other core in the first pair in that alternation of the line voltage.

15. A magnetic power amplifier, including, a plurality of saturable cores, a plurality of line windings each being magnetically associated with a different one of the cores, means for providing for the introduction of cyclic line voltage to the line windings, means for introducing signal energy differentially to pairs of cores in the plurality relative to the introduction of line voltage to the associated line windings to produce a temporal separation of the core saturations in particular pair during each half cycles of the line voltage, a load, and an output circuit associated with the different line windings and with the signal means and including the load for providing an amplification of power in the output circuit during the temporal separation of the core saturations in each pair in the particular half cycles of line voltage and in the same half cycles of the line voltage as the introduction of the signal energy and without any transfer of the signal energy in the cores from those half cycles to the next half cycles.

16. A magnetic power amplifier, including, a plurality of saturable cores, a plurality of line windings each being magnetically associated with a different one of the cores, means for providing for the introduction of cyclic line voltage to the line windings, means for introducing signal energy in opposite polarities to pairs of line windings relative to the introduction of line voltage to the windings to produce a saturation of one of the cores in each pair before any saturation of the other core in the pair in particular half cycles of the line voltage, a load, unidirectional means, and an output circuit including the load and the unidirectional means, the output circuit being associated with the line windings and with the signal means to provide a low impedance upon the saturation of one of the cores in each pair for the delivery of an output current in the same half cycle of the line voltage as the introduction of the signal energy and until the saturation of the other core in a particular pair in that half cycle of the line voltage and without any transfer of memory as represented by the introduction of signal energy to the line windings in that half cycle of the line voltage.

17. A magnetic power amplifier, including, a first pair of saturable cores, a second pair of saturable cores, a first pair of line windings each being magnetically associated with a different one of the cores in the first pair, a first pair of output windings each being magnetically associated with a different one of the cores in the first pair, a second pair of line windings each being magnetically associated with a different one of the cores in the second pair, a second pair of output windings each being magnetically associated with a different one of the cores in the second pair, means for introducing cyclic line voltage to each of the line windings, means for introducing signals of opposite polarities to the input windings in each pair relative to the introduction of line voltage to the windings to produce a saturation of one of the cores in each pair before any saturation of the other core in the pair in particular half cycles of the line voltage, and an output circuit including a load and unidirectional means in series with the output windings for producing in the particular half cycles of line voltage a low impedance to the load upon the saturation of one of the cores in each pair in those half cycles of the line voltage and until a saturation of the other core in the first pair in those half cycles of the line voltage for the production of output pulses in the same half cycles as the introduction of the signals and without any transfer of signal energy from those half cycles of the line voltage to the next half cycles of the line voltage.

18. A multi-stage magnetic amplifier, including, a plurality of saturable cores, a plurality of line windings each being magnetically associated with a different one of the cores, means for connecting the line windings to pair the cores in the plurality, means for introducing alternating line voltage to the windings to produce core saturations in each alternation, means for introducing signal energy differentially to the cores in a first pair relative to the introduction of line voltage to produce a temporal separation in the core saturations in the pair, and a plurality of output circuits each coupling the output of one stage to the input of the next stage and each controlled by the saturation of the associated cores in the first stage to produce a power amplification of the signal energy in the same half cycle as the introduction of the signal energy and upon the saturation of one of the cores in the first stage and until a saturation of the other core in the stage in that half cycle to introduce the amplified signal energy differentially to the pair of cores in the next stage relative to the introduction of line voltage to produce a temporal separation of core saturations in the next stage, the cores and windings for each stage being provided with characteristics to produce an initial core saturation in the stage for each half cycle of line voltage only after an initial core saturation in the previous stage for the half cycle for an amplification of the signal energy through several stages in the same half cycle as the introduction of the signal energy to the first stage.

19. A multi-stage magnetic amplifier, including, a plurality of saturable cores disposed in pairs, a plurality of line windings each being magnetically associated with a different core in the plurality, a plurality of output windings each being magnetically associated with a different core in the plurality, means for introducing cyclic line voltage to the line windings to produce core saturations, means for differentially introducing signal energy to the cores paired in a first stage to produce a saturation of one of the cores paired in the stage before any saturation of the other core paired in the stage, and an output circuit for each stage including unidirectional means and the output windings for the stage for producing a power amplification of the signal energy introduced to the stage upon the saturation of one of the cores paired in the stage and until the saturation of the other paired core in the stage, the output circuit for each stage including means for introducing the amplified output energy from each stage differentially to the cores in the next stage to produce a saturation of one of the cores paired in the next stage before any saturation of the other core paired in the stage in the same half cycle of the line voltage as the introduction of the amplified output energy to the next stage, the cores and windings in each stage being provided with characteristics to produce an initial core saturation in each stage for each half cycle of line voltage only after the production of initial core saturations in the previous stage for the same half cycle for an amplification of the signal energy through the stages in the same half cycle of the line voltage as the introduction of the signal energy and without any transfer of the signal energy from that half cycle of the line voltage to the next half cycle.

20. A multi-stage magnetic amplifier, including, a plurality of saturable cores disposed in pairs, a plurality of line windings each being magnetically associated with a different one of the cores, a plurality of input windings each being magnetically associated with a different one of the cores, a plurality of output windings each being magnetically associated with a different one of the cores, means for introducing cyclic line voltage to the line windings to produce core saturations, means for introducing signals of opposite polarities to a first pair of windings in the plurality relative to the introduction of line voltage to the windings in particular half cycles of the line voltage to produce a saturation of one core in the associated pair before any saturation of the other core in those half cycles of the line voltage, an output circuit for each stage including the output windings for the stage and the input windings for the next stage for producing a load current upon the saturation of the core associated with one of the output windings in the stage and until a saturation of the core associated with the second output winding in the stage to obtain the load current in the same half cycle as the introduction of the signal energy differentially to the output circuit, the input windings being connected differentially in each stage relative to the connection of the line windings in the stage to provide an introduction of output current from the previous stage to the input windings on a differential basis, the cores and windings for each stage being provided with characteristics to produce an initial saturation of the core associated with one of the output windings in the stage for each half cycle of line voltage before an initial saturation of the core associated with one of the input windings in the next stage for the half cycle to obtain a proper transfer of the signal energy on an amplified basis in that half cycle of the line voltage from each stage to the next.

21. A magnetic amplifier as set forth in claim 20, in which unidirectional means are included in each output circuit to limit the flow of output current in each half cycle of the line voltage until a saturation in that half cycle of the line voltage of at least one of the cores associated with the output windings in the circuit.

22. A magnetic power amplifier, including, a first saturable core, a second saturable core, a first pair of windings magnetically associated with the first saturable core, a second pair of windings magnetically associated with the second saturable core, means for introducing cyclic line voltage to the windings, means for introducing, in particular half cycles of the line voltage, signals of opposite polarities to the windings in the first and second pairs relative to the line voltage introduced to the windings in those half cycles to produce a saturation of one of the cores before any saturation of the other core in those half cycles, and output circuitry including the windings and a load for delivering an output current to the load in the same half cycles of the line voltage as the introduction of the signals and upon the saturation of one of the cores and until a saturation of the other core in those half cycles and representing a power amplification greater than unity relative to the energy introduced by the signals in those half cycles and without any transfer of memory from those half cycles to the next half cycles.

23. A magnetic power amplifier, including, a first saturable core, a first pair of windings magnetically associated with the core, a second saturable core, a second pair of windings magnetically associated with the second core, means for providing for the introduction of cyclic line voltage to the windings in each pair, means for introducing signal energy differentially to the windings in the first pair relative to the introduction of signal energy to the windings in the second pair and relative to the introduction of line voltage to the windings in both pairs in particular half cycles of the line voltage to produce a saturation of one of the cores before any saturation of the other core in the particular half cycles of line voltage, a load, unidirectional means, and output circuitry including the unidirectional means, the load and the windings for producing power amplification of the signal energy upon a saturation of one of the cores and until a saturation of the other core in the particular half cycles of the line voltage in accordance with the introduction of the signal energy to the windings in those half cycles and in the same half cycles as the introduction of the signal energy to the windings.

24. A magnetic power amplifier, including a first saturable core, a second saturable core, a first pair of windings magnetically associated with the first core, a second pair of windings magnetically associated with the second core, means for introducing cyclic line voltage to the windings to produce core saturations, the windings in the first and second pairs being connected in a bridge circuit in which the windings in each pair define opposite legs of the bridge, means for introducing signal energy differentially to the cores in particular half cycles of the line voltage to produce a saturation of one of the cores before a saturation of the other core in those half cycles of the line voltage, a load, and output circuitry including the windings and the load connecetd between opposite legs of the bridge for delivering an output current to the load in the same half cycles as the introduction of the signal energy and upon the saturation of one of the cores and until a saturation of the other core in those half cycles and for delivering to the load in those half cycles an output current representing a power amplification greater than unity relative to the signal energy introduced in those half cycles and without any transfer of signal energy in the cores from those half cycles to the next half cycles.

25. A magnetic power amplifier, including, a first saturable core, a second saturable core, a first pair of windings magnetically coupled to the first core, a second pair of windings magnetically coupled to the second core, the windings in the first and second pairs being connected in a bridge circuit having first and second pairs of opposite terminals, the windings in each pair defining opposite legs in the bridge, means for providing for the introduction of alternating line voltage between the first pair of terminals in the bridge, means for introducing signal energy differentially between the second pair of terminals in the bridge in particular alternations of the line voltage to produce a saturation of one of the cores before any saturation of the other core in those alternations of the line voltage, a load, unidirectional means, and output circuitry including the unidirectional means and the load and connected between the second pair of terminals for producing a power amplification greater than unity of the signal energy in the same alternations of the line voltage as the introduction of signal energy and upon a saturation of one of the cores and until a saturation of the other core in those alternations and without any transfer of the signal energy in the cores from those half cycles to the next half cycles.

26. A magnetic power amplifier, including, a first saturable core, a first pair of windings magnetically coupled to the first core, a second saturable core, the first and second cores being paired, a second pair of windings magnetically coupled to the second core, a third saturable core, a third pair of windings magnetically coupled to the third core, a fourth saturable core, the third and fourth cores being paired, a fourth pair of windings magnetically coupled to the fourth core, means for introducing cyclic line voltage to each of the windings, means for introducing signal energy differentially to the windings in the first and third pairs relative to the introduction of signal energy to the windings in the second and fourth pairs and relative to the introduction of line voltage to the windings in particular half cycles of the line voltage to produce a saturation of one of the cores in each pair before a saturation of the other core in the pair in those half cycles of the line voltage, a load, and an output circuit including the windings and the load for producing a power amplification greater than unity of the signal energy in the same half cycles of line voltage as the introduction of the signal energy and upon a saturation of one of the cores in each pair and until a saturation of the other core in the pair in those half cycles of the line voltage.

27. A magnetic power amplifier, including, a first pair of saturable cores, a second pair of saturable cores, first and second pairs of windings magnetically associated with the saturable cores in the first pair, third and fourth pairs of windings magnetically associated with the saturable cores in the second pair, means for introducing cyclic line voltage to the windings to produce core saturations, the windings in the first and second pairs being connected in a first bridge circuit in which the windings in each pair define opposite legs of the bridge, the windings in the third and fourth pairs being connected in a second bridge circuit in which the windings in each pair define opposite legs of the bridge, means for introducing signal energy differentially to the cores associated with each bridge relative to the introduction of the cyclic line voltage and for introducing the signal energy in particular half cycles of the line voltage to produce a saturation of one of the cores in each bridge before any saturation of the other core in the bridge in those half cycles of the line voltage, unidirectional means, a load, and output circuitry including the windings, the unidirectional means and the load for delivering an output current to the load in the same half cycles of line voltage as the introduction of the signal energy and upon a saturation of one of the cores in each pair and until a saturation of the other core in the pair in those half cycles of the line voltage and for delivering in each of those half cycles of the line voltage an output current representing in the load a power output greater than unity relative to the signal energy introduced in that half cycle and without any transfer of signal energy in the cores from that half cycle to the next half cycle.

28. A magnetic power amplifier, including, a first pair of saturable cores, a second pair of saturable cores, first and second pairs of windings magnetically coupled to the cores in the first pair, third and fourth pairs of windings magnetically coupled to the cores in the second pair, the windings in the first and second pairs being connected in a first bridge having first and second pairs of opposite terminals, the windings in each of the first and second pairs defining opposite legs in the bridge, the windings in the third and fourth pairs being connected in a second bridge having first and second pairs of opposite terminals, the windings in each of the third and fourth pairs defining opposite legs in the second bridge, means for providing for the introduction of cyclic line voltage between the first pair of terminals in each bridge, means for introducing signal energy differentially between the second pair of terminals in each bridge relative to the introduction of the line voltage and in particular half cycles of the line voltage to produce a temporal separation in the core saturations in each pair, a load, unidirectional means, and output circuitry including the windings, the unidirectional means and the load for providing a high impedance in the half cycles of line voltage before the saturation of any cores and for providing a low impedance upon a saturation of one of the cores in each pair for obtaining the delivery of output current through the load until a saturation of the other core in at least the first pair and for obtaining such delivery of the output current in the same half cycles as the introduction of the signal energy and on an amplified basis greater than unity with respect to the introduction of the signal enegry in those half cycles of the line voltage and for the use of all of the signal energy in those half cycles of the line voltage to prevent any memory between successive half cycles of the line voltage.

29. A magnetic power amplifier as set forth in claim 28, in which the unidirectional means are connected in a third bridge having first and second pairs of opposite terminals and in which the second pair of terminals in the first bridge have an electrical continuity with the first pair of terminals in the third bridge and in which the second pair of terminals in the second bridge have an electrical continuity with the second pair of terminals in the third bridge.

30. In combination, means for providing a reference signal, a load, means for comparing the reference signal with the signal from the load to produce an error signal representing any differences between the reference and load signals, a first saturable core, a second saturable core, cyclically operable means including means for simultaneously exposing the cores to flux produced by an alternating line current for alternately producing core saturations initially in one direction and then in the opposite direction, means for introducing the error signal differentially to the cores relative to the introduction of the line current in each alternation of the line current to produce a saturation of one of the cores before any saturation of the other core during that alternation of the line current, and an output circuit including the load for providing for the delivery to the load, in the same alternation of the line current as the introduction of the error signal and upon a saturation of one of the cores and until a saturation of the other core in that alternation of the line current, of an output signal having reduced differences relative to the reference signal.

31. In combination, a first saturable core, a first line winding magnetically associated with the first core, a first output winding magnetically associated with the first core, a second saturable core, a second line winding magnetically associated with the second core, a second output winding magnetically associated with the second core, means for providing for the introduction of cyclic line voltage to the first and second line windings, means for introducing signal energy differentially to the line windings relative to the introduction of line voltage to the windings in particular half cycles of the line voltage to produce a saturation of one of the cores before any saturation of the other core during the particular half cycles of the line voltage, a load, an output circuit including the output windings and the load for producing output signals representing a power amplification greater than unity of the signal energy in the same half cycles of the line voltage as the introduction of the signal energy and upon the saturation of one of the cores and until a saturation of the other core in those half cycles of the line voltage, means for providing a reference signal, and means for producing error signals representing any differences between the reference signal and the output signals from the load in the same half cycles as the production of the output signals for introduction of the error signals as the signal energy to the line windings in the next half cycles of the line voltage and in a direction to further reduce any differences between the reference signal and the output across the load in those next half cycles of the line voltage.

32. In combination, a first saturable core, a second saturable core, a first pair of windings magnetically associated with the first saturable core, a second pair of windings magnetically associated with the second saturable core, means for introducing cyclic line voltage to the windings, means for introducing error signals of opposite polarities to the windings in the first and second pairs relative to the introduction of cyclic line voltage to the windings in particular half cycles of the line voltage to produce a saturation of one of the cores before any saturation of the other core in those half cycles of the line voltage, a motor, output circuitry including the windings and the motor for delivering an output current to the motor in the same half cycles of the line voltage as the introduction of the error signals and upon the saturation of one of the cores and until a saturation of the other core in those half cycles of the line voltage to produce an operation of the motor, comparison means having a variable positioning, and means for producing the error signals in the particular half cycles of the line voltage in accordance with the difference in positioning between the motor and the comparison means for introduction of the error signals to the windings to produce an output current in those half cycles of the line voltage for positioning the motor in accordance with the positioning of the comparison means.

33. In combination, means for providing a reference signal, a load having variable characteristics in accordance with changes in the characteristics of the reference signal, means for producing an error signal representing any differences between the reference signal and the signal from the load, a first pair of saturable cores, a second pair of saturable cores, cyclically operable means including means for simultaneously exposing the cores to flux produced by an alternating line current for alternately producing core saturations initially in one direction and then in the opposite direction in successive half cycles of the line voltage, means for effecting a temporal separation of the saturation of the cores in each pair in particular half cycles of the line voltage including means for exposing the cores to flux produced by the error signal, and means including the load for operating in synchronism with the saturation of at least one of the cores in the first pair and in the second pair to obtain the delivery to the load, in the same half cycle of the line voltage as the introduction of the error signal and until the saturation of the second core in the first pair in that half cycle of the line voltage, of an output signal having characteristics to reduce the error signal and without any transfer of signal energy from that half cycle of the line voltage to the next half cycle.

34. In combination, a motor, means driven by the motor, reference means having a variable positioning, means for producing error signals having characteristics representing any difference in the positioning between the driven means and the reference means, a plurality of saturable cores, a plurality of line windings each being magnetically associated with a different one of the cores, means for providing for the introduction of cyclic line voltage to the line windings, means for introducing the error signal in opposite polarities to pairs of line windings relative to the introduction of line voltage to the windings in particular half cycles of the line voltage to produce a saturation of one of the cores in each pair before any saturation of the other core in the pair in those half cycles of the line voltage, and an output circuit including the motor, the output circuit being associated with the line windings to produce in the same half cycles of the line voltage as the introduction of the error signals and upon the saturation of one of the cores in each pair and until the saturation of the other core in a particular pair in those half cycles of the line voltage, output signals having an amplification greater than unity relative to the error signals introduced in those half cycles and having a polarity for driving the motor in a direction to minimize the error signals produced in successive half cycles of the line voltage and without obtaining any memory as represented by a transfer from those half cycles to successive half cycles of energy produced in the cores by the error signals.

References Cited in the file of this patent

UNITED STATES PATENTS

| | | |
|---|---|---|
| 2,108,642 | Boardman | Feb. 15, 1938 |
| 2,509,864 | Hedstrom | May 30, 1950 |
| 2,719,885 | Ramey | Oct. 4, 1955 |

OTHER REFERENCES

Publication entitled Magnetic Amplifier Circuits and Applications by R. A. Ramey, September 1953, Electrical Engineering, pp. 791–795, incl.